US012135890B1

(12) United States Patent
Lim et al.

(10) Patent No.: US 12,135,890 B1
(45) Date of Patent: Nov. 5, 2024

(54) IMPLICIT CLASSIFICATION OF STORED OBJECTS FOR ARBITRARY WORKLOADS

(71) Applicant: Tintri by DDN, Inc., Santa Clara, CA (US)

(72) Inventors: Khian Thong Lim, Fremont, CA (US); David Brian Milani, Sunnyvale, CA (US); Atul Pendse, Maharashtra (IN); Jeff Hing, Santa Cruz, CA (US); Thomas Clifford, Edina, MN (US)

(73) Assignee: Tintri by DDN, Inc., Chatsworth, CA (US)

( * ) Notice: Subject to any disclaimer, the term of this patent is extended or adjusted under 35 U.S.C. 154(b) by 136 days.

(21) Appl. No.: 17/561,023

(22) Filed: Dec. 23, 2021

(51) Int. Cl.
*G06F 16/00* (2019.01)
*G06F 3/06* (2006.01)
*G06N 5/04* (2023.01)

(52) U.S. Cl.
CPC .......... *G06F 3/0643* (2013.01); *G06F 3/0604* (2013.01); *G06F 3/0673* (2013.01); *G06N 5/04* (2013.01)

(58) Field of Classification Search
None
See application file for complete search history.

(56) References Cited

U.S. PATENT DOCUMENTS

| 8,954,383 B1 * | 2/2015 | Vempati | G06F 16/128 707/610 |
| 2021/0055885 A1 * | 2/2021 | Strathman | G06F 3/0665 |

FOREIGN PATENT DOCUMENTS

| RU | 2353068 C2 * | 4/2009 | ............. G06F 3/011 |
| WO | WO-2021050875 A1 * | 3/2021 | .......... G06F 11/1458 |

* cited by examiner

*Primary Examiner* — Tuankhanh D Phan
(74) *Attorney, Agent, or Firm* — Van Pelt, Yi & James LLP

(57) ABSTRACT

The present application discloses a method, system, and computer system for associating stored objects with a storage management object. The method includes inferring, based at least in part on metadata comprising or otherwise associated with a set of stored objects stored in the memory or other data storage device, an interdependence among the stored objects comprising the set of stored objects, associating the stored objects comprising the set of stored objects with a storage management object, and applying a storage management policy to the stored objects comprising the set of stored objects based at least in part on said association of the stored objects comprising the set of stored objects with the storage management object.

23 Claims, 9 Drawing Sheets

IMPLICIT CLASSIFICATION OF STORED OBJECTS FOR ARBITRARY WORKLOADS

BACKGROUND OF THE INVENTION

Data belonging to an application are stored on storage systems. Typical storage systems store data as files, file systems, LUNs, volumes, and/or other stored objects, for example, without an awareness of which stored objects are associated with which application. However, there may be a need or desire to manage groups of stored objects, such as files, based on an application with which the stored objects are associated and/or the importance to the data owner of a subset of objects associated with an application. A management object on a storage system may be provided to manage or facilitate management of stored objects based on the application with which they are associated, but to do so each stored object or set of stored objects must be mapped to a corresponding management object, e.g., based on an application or other workload with which the stored object is associated. Such a mapping may be configured, e.g., by an administrative user, or determined by the storage system sending a query to an application server or other entity to determine the mapping explicitly, but it may not always be possible, practical, or desirable to determine the mapping explicitly in such a way, e.g., due to communication and processing overhead that could result in delay and/or use of resources that could be used for other purposes and/or lack of an application programming interface (API) or other interface usable by the storage system to determine the mapping.

BRIEF DESCRIPTION OF THE DRAWINGS

Various embodiments of the invention are disclosed in the following detailed description and the accompanying drawings.

DETAILED DESCRIPTION

Figure 1:
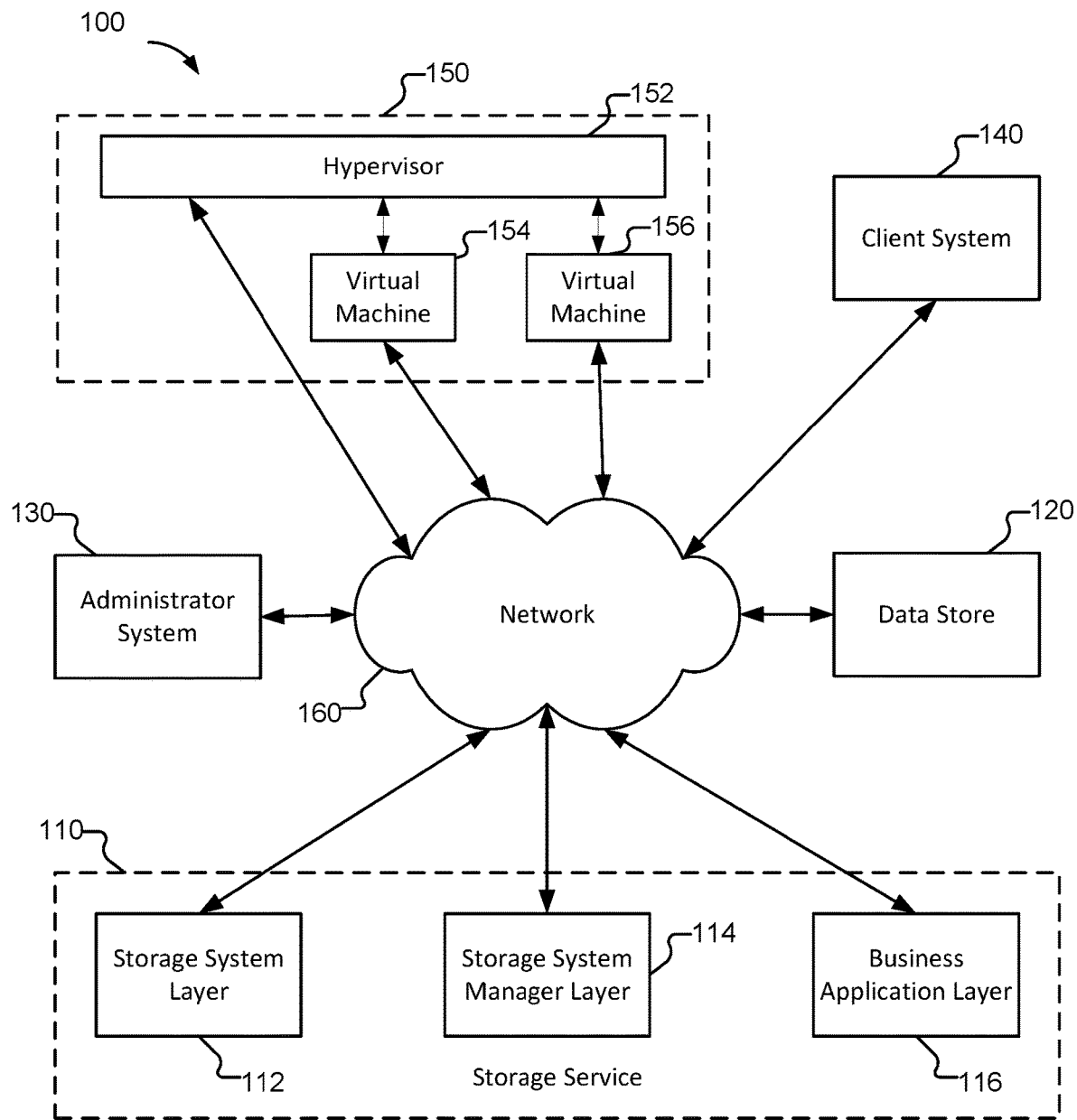
FIG. 1 is a block diagram of a system to infer a storage management object with which to associate a stored object according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a "storedobject" comprises data that can be stored on a storage system as a defined unit or entity. Examples of stored objects include files, file systems, LUNs, and volumes. Various other data of different granularities may be a stored object.

As used herein, a management object (which may also be referred to herein as a storage management object) refers to an object used to manage a stored object based at least in part on a source, e.g., an application or other workload, that provided the stored object to a storage system. In various embodiments, a management object may include one or more of data that associates one or more stored objects with the management object; data that associates one or more storage management policies with the management object, e.g., quality of service (QOS), data isolation, data protection, and/or other policies; and data and/or methods to implement said one or more storage management policies.

As used herein, a workload is an element (or set of elements) that generates and/or updates objects that are to be stored on a storage system. A workload may be a physical device and/or a virtual machine, or an application or other process running on either. Examples of a workload include a virtual machine, an application running on a client device, a server, an operating system running on a client device, a virtual machine, an application running on a virtual machine, a database (e.g., a SQL database) running on a virtual machine, etc. A workload may have 1 to n virtual machines, n being a positive integer. Various other elements may be implemented as a workload.

Various embodiments provide a system, device, and/or method for associating one or more stored objects with a storage management object. In some embodiments, the one or more stored objects are associated with the storage management object based on an inferred relationship between the one or more stored objects and the storage management object. For example, relationship between the one or more stored objects and the storage management object may be inferred based at least in part on one or more attributes associated with at least one of the one or more stored objects. Examples of attributes associated with a stored object include a logical location of the object (e.g., directory or subdirectory), a size of the object (e.g., a file size), a type of object, a file extension of the object, an access pattern, a creation pattern, a signature or hash of the stored object, update frequency, etc. An attribute may be included in metadata associated with the stored object. Various other attributes associated with a stored object may be implemented. In some embodiments, the relationship between the one or more stored objects and the storage management object may be inferred based at least in part on one or more rules for classifying an object. The one or more rules may be determined based on a machine learning process. Various other techniques for defining/setting the one or more rules may be implemented.

According to various embodiments, an interdependence among stored objects comprising a set of stored objects is inferred based at least in part on metadata comprising or otherwise associated with a set of stored objects stored in the memory or other data storage device. The stored objects comprising the set of stored objects are associated with a storage management object. A storage management policy is applied with respect to the stored objects comprising the set of stored objects based at least in part on the association of the stored objects comprising the set of stored objects with the storage management object. In some embodiments, the stored objects comprising the set of stored objects are associated with a storage management object based on least in part on one or more attributes associated with at least one of the stored objects. In some embodiments, the interdependence among the stored objects is inferred based at least in part on one or more of (i) access patterns, (ii) a file type or file extension, (iii) a file size, (iv) creation patterns, (v) a comparison of patterns in a production environment and a development environment, and (vi) a learning of a machine learning model.

In response to a set of stored objects being associated with a storage management object, one or more storage management policies may be enforced (e.g., applied) with respect to the set of stored object. For example, the system determines a storage management policy corresponding to storage management object and uses such storage management policy in connection with storing and/or providing access to the set of stored objects. As an example, a storage management policy may pertain to one or more of (i) a quality of service, (ii) an allocation of resources, (iii) a replication or snapshot of data, (iv) a monitoring of performance or usage, and (v) an isolation from explicit workloads associated with a same application. Various other types of storage management policies may be implemented.

Various embodiments implement a relational model and/or machine learning process in connection with inferring associations among stored objects and/or between a stored object and a storage management object, such as a workload. The system may determine new rules for classifying/characterizing a stored object and/or associating a stored object with a storage management object in response to a determination that a new file or new workload, such as an application, are identified. In some embodiments, in response to determining a new rule, the system requests a user (e.g., an administrator such as an administrator of a storage system, or an administrator of a customer that deploys workloads to store objects on the storage system) to validate the new rule. For example, the system may configure and provide a user interface comprising information pertaining to the new rule (e.g., information indicating mapping of a set of files to a workload, etc.).

According to various embodiments, a storage system comprises a storage system layer that interprets data deployed to the storage system by a hypervisor or other application-level manager of application workloads and/or storage of stored objects associated with such workloads, and determines an association among a set of objects stored on the storage system and/or an association between a stored object and or the workload. For example, the storage system layer determines an implicit mapping between the stored object and the workload such as an application. The storage system layer may determine the implicit mapping based at least in part on one or more attributes of the stored object (or a set of stored objects) such as an object size or an object type. In some embodiments, the system maps a stored object to a virtual machine, or an application running on a virtual machine without an explicit mapping provided by a hypervisor that manages the virtual machine. In some embodiments, the storage system layer analyzes storage objects that do not belong to a virtual machine or storage management object, and the storage system layer decides what storage objects the storage system layer is to monitor and to which a dedicated resource is to be assigned by storage system layer.

According to various embodiments, a storage system comprises a storage system layer that interprets data deployed to the storage system by a hypervisor or other application-level manager of application workloads and/or storage of stored objects associated with such workloads, and determines an association among a set of objects stored on the storage system and/or an association between a stored object and or the workload. In some embodiments, storage system layer stores one or more rules used in connection with identifying stored objects stored (e.g., on storage system) to which storage system layer is to assign resources (e.g., to be assigned a storage management object). The storage system layer finds the stored objects (e.g., stored on storage system) that are not assigned to a storage management object (e.g., an existing storage management object), and determines whether the stored objects satisfy the one or more rules used in connection with identifying stored objects stored (e.g., on storage system) to which storage system layer is to assign resources (e.g., to be assigned a storage management object). The system may determine whether the stored objects satisfy such one or more rules on a stored object-by-stored object basis. The one or more rules include: a rule pertaining to a location or path of a file, a rule pertaining to a file size, and a rule pertaining to a file extension. In some embodiments, the one or more rules are predefined by a user or determined based at least part on a machine learning process. In some embodiments, in response to storage system layer determining that a stored object satisfies at least one of the one or more rules, the storage system layer creates a new storage management object (or virtual machine) and associates the stored object with the storage management object. In some embodiments, the storage system will use the new storage management object information in connection with allocating resources (e.g., quality of service, etc.) to the storage management object such as in connection with accessing the stored object. In some embodiments, the storage system layer creates the storage management object in response to a determination that the stored object satisfies all the one or more rules.

According to various embodiments, a storage system comprises a storage system layer that interprets data deployed to the storage system by a hypervisor or other application-level manager of application workloads and/or storage of stored objects associated with such workloads, and determines an association among a set of objects stored on the storage system and/or an association between a stored object and or the workload. In some embodiments, the storage system layer automatically discovers an instance deployed on the storage system (e.g., a database instance, an Oracle® instance, etc. deployed on the storage system). As an example, the storage system layer automatically discovers the instance without using information (e.g., information specifically identifying the instance) communicated by a hypervisor or a server managing the instance (e.g., an Oracle® server). According to various embodiments, the storage system layer scans a set of files (e.g., a directory). For example, the storage system layer receives information from a user indicating the set of files to scan (e.g., a user selects a directory to be scanned). In response to identifying a file (or in connection with scanning the set of files), the storage system layer determines (e.g., ensures) that the files are not associated with a storage management object (e.g., an existing storage management object). The storage system layer scans the set of files in the directory and determines a subset of files to be grouped together. In response to determining a subset of files to be grouped together, the storage system layer creates a new storage management object and associates the subset of files grouped together with the storage management object. In some embodiments, the storage system layer is able to determine (e.g., understands, is compatible with, etc.) various deployments of database instances/Oracle® instances, such as network file system (NFS), Direct NFS, and automatic storage management (ASM).

Related art storage systems classify/characterize stored objects according to an explicit definition of a management object to which a workload is to be mapped. As an example, a virtual machines within a virtual machine cluster stores a set of objects on a storage system such as a database. Virtual machine clusters comprise a hypervisor that creates and/or manages virtual machines within the virtual machine cluster. In related art systems, the hypervisor provides the storage system with the explicit classification/characterization of an object being stored on the storage system by a virtual machine (e.g., a virtual machine managed by the hypervisor). For example, the hypervisor manages storage and mapping of files to a storage system. In response to receiving the objects to be stored, a database manager associates the object with the storage management object (e.g., the virtual machine or an application running on a virtual machine, etc.) according to the explicit classification/characterizations provided by the hypervisor. The database manager determines (e.g., learns) a file mapping of files stored on a storage system to applications based on an explicit indication provided by the storage management object corresponding to the file. The database manager may be a layer running on (or with respect to) a storage system. The related art systems generally require a user to manually configure a storage system to identify/connect with the hypervisor(s) managing virtual machines that store objects on the storage system, and to identify/connect with the database manager to enable the storage system to properly associate objects being stored with a storage management object. For example, in the case of a hypervisor attached to the storage system, the storage system communicates to the hypervisor manager to determine where and how a particular hypervisor is attached and the data associated with a particular hypervisor. In addition, the related art systems generally require a user to explicitly define a set of rules for classifying/characterizing stored objects to facilitate the association of the objects with a storage management object. At least because the related art systems require user configuration of the hypervisor and/or database manager, and/or user definition of classification/ characterization rules, such related art systems are not ideal at scale. Furthermore, related art systems for associating files with a management object was limited to implementations including virtual machines because such related art system relied on a hypervisor providing the explicit classification/characterizations for associating the files with an application or virtual machine.

Various embodiments improve the scalability with which objects stored on a storage system are associated with storage management objects. Related art systems are generally time consuming and costly to develop, utilize resources on the application attempting to store objects to the storage system, and require a channel to communication with the application. For example, related art storage systems require prior knowledge of an application running on a virtual machine for the storage system to associate an object with the application. Various embodiments implements an implicit mapping of stored objects to a storage management object (e.g., a workload). For example, various embodiments provide extensibility to map stored objects to arbitrary workloads, such as based on an inferred interdependence among stored objects. Although related art systems are limited to explicit workloads such as virtual machines and SQL databases that are grouped on a determination by an object manager such as a hypervisor, various embodiments provide mapping of objects to implicit workloads such as based on an inferred interdependence among stored objects. Accordingly, various storage management policies, such as a policy that provides particular workloads with at least a specified quality of service, can be extended to implicit workloads.

FIG. 1 is a block diagram of a system to infer a storage management object with which to associate a stored object according to various embodiments.

In the example illustrated in FIG. 1, system 100 includes storage service 110, a data store 120, administrator system 130, client system 140, and/or a virtual machine cluster 150. In some embodiments, storage service 110 and data store 120 are integrated (e.g., combined into a layer or a single set of server(s)). In some embodiments, data store 120 and virtual machine cluster 150 are integrated (e.g., combined into a layer or a single set of server(s)). In some embodiments, storage service 110, data store 120, and virtual machine cluster 150 are integrated (e.g., combined into a layer or a single set of server(s)). In some embodiments, storage service 110 comprises storage system layer 112, storage system manager layer 114, and/or business application layer 116. System 100 further includes one or more networks such as network 160 over which administrator system 130, client system 140, and/or virtual machine cluster 150 communicate with storage service 110 and/or data store 130. In various embodiments, network 160 includes one or more of a wired network, and/or a wireless network such as a cellular network, a wireless local area network (WLAN), or any other appropriate network. In some embodiments, storage system layer 112, storage system manager layer 114, and/or business application layer 116 are respectively implemented by one or more servers. System 100 may include various other systems or terminals.

Storage service 110 stores (or has access to) one or more relationships and relational models for grouping objects stored on data store 120 and/or for mapping an object (or a set of stored objects) to a storage management object (e.g., a workload such as virtual machine or an application). In some embodiments, storage service 110 uses a machine learning process in connection with determining the implicit grouping of objects stored on data store 120 and/or for determining an implicit mapping of object(s) to workload. Storage service 110 may store (or have access to) a machine learning model and/or a feature to user in connection training or applying such machine learning model. Examples of machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc.

According to various embodiments, storage service 110 detects objects stored on data store 120 that are not mapped to a particular workload (e.g., such data objects may also be referred to herein as stray objects or stray files). As an example, storage service 110 monitors the storage service 110 and detects stray objects. Storage service 110 may monitor the storage service continuously or at periodic intervals (e.g., predetermined intervals that may be set by an administrator). In response to detecting a stray object (or set of stray objects), storage service 110 uses the one or more relationships and relational models to group the stray objects and/or to map the stray object (or a set of stored objects) to a corresponding storage management object.

Storage service 110 stores (or has access to) one or more storage management policies. The one or more storage management policies may comprise one or more rules or information for providing service objectives with respect to a particular stored object (or set of stored objects), such as a stored object mapped to a particular storage management object. A storage management policy may be enacted at an object-level (e.g., at a file-level) or at a file system object-level. Example storage management policies include, but are not limited to the following: quality of service (QOS), one or more guarantees, one or more resources quotas, a snapshot schedule, and a retention policy. Various other storage management policies may be implemented. Storage service layer 110 is configured to perform operations pertaining to stored objects of a file system object stored at data store 130 in accordance to the one or more storage management policies corresponding to the stored object(s). In connection with providing a service/operation in accordance with a storage management policy, storage service 110 may determine a storage management object with which a stored object is associated, and determine the applicable storage management policies based at least in part on the storage management object. For example, storage service 110 performs a lookup against a mapping of storage management policies to storage management objects to determine one or more policies to apply with respect to a particular stored object. A storage management policy may be defined by a user, such as an administrator of the storage system, an administrator or a customer or system that is configured to deploy workloads to a storage system, etc. For example, storage service 110 provides to a third party a service of storing data on a storage system, and an administrator associated with the third party sets (e.g., defines) one or more storage management policies to be applied with respect to objects (e.g., data) stored in connection with storage management objects corresponding to such third party.

According to various embodiments, storage service 110 uses storage system layer 112 to monitor the storage system (e.g., objects stored on data store 120) and to determine associations between a stored object (or a set of stored objects) and a storage management object. In some embodiments, storage system layer 112 determines an association between a stored object and a storage management object without an explicit definition of such instruction (e.g., without receiving an explicit indication from a hypervisor that data stored to data store 120 is to be associated with a particular virtual machine or an application running on a virtual machine managed by the hypervisor). Storage system layer 112 associates a stored object with an implicit workload (e.g., an application, a database, a physical device). For example, storage system layer 112 implicitly determines that a stored object is to be handled in accordance with a storage management policy associated with a particular storage management object(s). In some embodiments, storage system layer 112 stores (or has access to) an association between stored objects (or sets of stored objects) and storage management objects. In response to determining an implicit correspondence between a stored object and a storage management objects, storage system layer 112 may update a mapping of stored objects to storage management objects. In some embodiments, storage service 110 uses storage system layer 112 to apply one or more relationships and relational models for grouping objects stored on data store 120 and/or for mapping an object (or a set of stored objects) to a storage management object. For example, storage system layer 112 may apply a machine learning process/model to analyze stored objects on data store 120 and determine (i) a grouping of stored objects, and/or (ii) association(s) between the stored objects and a storage management object(s).

In some embodiments, storage service 110 (e.g., storage system layer 112) determines a relational model between objects stored at data store 120 and storage management objects based on historical classifications. For example, storage service 110 comprises a set of predefined rules (e.g., rules that are determined based on a machine learning process and/or a definition/configuration provided by user or administrator).

In some embodiments, a stored object is stored to data store 120, and after storage of the stored object to data store 120, storage system layer 112 detects the stored object, determines that the stored object is not yet associated with a storage management object (e.g., that the stored object is a stray object), and determines a storage management object with which to associate the stored object. Related art systems generally receive an explicit indication of an association when data is being stored to a storage system (e.g., the indication may be received from a hypervisor or an object manager such as a database manager). For example, related art storage systems required writes to be mediated by a database manager. In contrast, various embodiments determine a storage management object with which to associate a stored object after the stored object has been stored to data store 120 (e.g., when the stored object is at rest on data store 120). For example, system 100 identifies the storage management object from which a file (or other object) stored at data store 120 arise, and storage service 110 treats such files accordingly (e.g., storage service 110 applies applicable storage management policies with respect to such files).

Storage system layer 112 monitors data store 120 for stored objects that are not associated with (e.g., mapped to)

a storage management object. Storage system layer 112 may infer an interdependence among stored objects comprising a set of stored objects stored on data store 120. For example, storage system layer 112 infers the interdependence among the stored objects comprising the set of objects based at least in part on one or more attributes of the stored objects (e.g., metadata respectively associated with the stored objects). Examples of attributes associated with a stored object include a location of the object, a size of the object (e.g., a file size), a type of object, a file extension of the object, an access pattern, a creation pattern, a signature or hash of the stored object, update frequency, etc. An attribute may be included in metadata associated with the stored object. Various other attributes associated with a stored object may be implemented.

According to various embodiments, storage service 110 uses storage system manager layer 114 in connection with enforcing/applying one or more storage management policies. Storage system manager layer 114 stores (or has access to) one or more storage management policies. As an example, a storage management policy may pertain to one or more of (i) a quality of service, (ii) an allocation of resources, (iii) a replication or snapshot of data, (iv) a monitoring of performance or usage, and (v) an isolation from explicit workloads associated with a same application. Various other types of storage management policies may be implemented. Storage system manager layer 114 determines a storage management object(s) to which a set of stored objects are mapped, and determines a set of one or more storage management policies corresponding to such storage management object(s). In response to a set of stored objects being associated with a storage management object, one or more storage management policies may be enforced (e.g., applied) with respect to the set of stored object. For example, the system determines a storage management policy corresponding to storage management object and uses such storage management policy in connection with storing and/or providing access to the set of stored objects. Storage system manager layer 114 may store a mapping of storage management objects to storage management policies, and storage system manager layer 114 may perform a lookup with respect to such mapping of storage management objects to storage management policies in connection with determining the storage management policy/policies corresponding to a storage management object.

According to various embodiments, storage system manager layer 114 provides a user interface via which a user configures and/or accesses one or more storage management policies, and/or rule sets or relational models that are managed/stored at storage system layer 112. In some embodiments, storage system manager layer 114 provides a user interface via which a user configures and/or accesses stored objects stored in data store 120. As an example, the web interface is provided as a web service such as on a page accessed by a user via client system 140.

According to various embodiments, business application layer 116 provides an interface via which a user (e.g., using client system 150) may interact with various applications such as a development application for developing a feature, a development application for developing a model, an application to access raw data (e.g., data stored in data store 130), an application to update a feature (e.g., to automatically update the feature such as by ingesting updated source data), an application to provide (e.g . . . , a batch providing or a real-time providing) a feature to models or end points (e.g., services) that use the feature, etc. Various other applications can be provided by business application layer 116. For example, a user queries database layer 105 by sending a query/request to business application layer 110, which interfaces with database layer 105 to obtain information responsive to the query (e.g., business application layer 110 formats the query according to the applicable syntax and send the formatted query to database layer 105). As another example, an administrator uses an interface provided/configured by business application layer 116 to configure (e.g., define) one or more security policies include access permissions to a feature.

According to various embodiments, data store 120 stores data such as one or more objects corresponding to (e.g., associated with) one or more storage management objects. For example, data store 120 receives objects from one or more workloads and stores the objects. Data store 120 may be managed at least in part by storage service 110. For example, data store 120 may provide an interface via which storage system layer 112 monitors stored objects (e.g., to detect stray objects), and an interface via which storage system manager layer 114 enforces applicable storage management security policies. In some embodiments, the data stored at data store 120 comprises one or more datasets. According to various embodiments, data store 120 is implemented by a same device (e.g., a same set of one or more servers) as virtual machine cluster 150. In some embodiments, data store 120 is integrated with virtual machine cluster 150.

According to various embodiments, business application layer 116 provides an interface via which a user (e.g., using client system 140) may interact with various applications such as a development application for developing a feature (e.g., one or more relationships among stored objects, relationships between stored objects and storage management objects, etc.), a development application for developing a model, an application to access raw data (e.g., data stored in data store 120), an application to update a storage management policy, etc. Various other applications can be provided by business application layer 116. For example, a user queries data store 120 by sending a query/request to business application layer 116, which interfaces with data store 120 to obtain information responsive to the query. As another example, an administrator uses an interface provided/configured by business application layer 116 to configure (e.g., define) one or more security policies include access permissions to a data stored in data store 120.

According to various embodiments, system 100 comprises an administrator system 130 for use by an administrator such as an administrator of storage service 110, or an administrator of a customer of the storage system (e.g., a customer associated with a particular storage management object, workload, etc.). For example, administrator system 130 comprises a system for communication, data access, computation, etc. An administrator uses administrator system 130 to maintain data store 120 (e.g., maintain raw data comprised in data store 120), to define and manage a relational model used by storage system layer 112, one or more rules used by storage system layer 112 to classify/characterize stored objects, and/or one or more storage management policies used by storage system manager layer 114 to manage storage/access to stored objects stored at data store 120. For example, an administrator uses administrator system 130 to upload or define a model or a feature of a model at storage system layer 112, to define one or more storage management policies, to validate one or more rules (e.g., to classify/characterize stored objects) used by storage system layer 112 in connection with grouping stored objects and/or associating stored objects with a storage management objects, etc. Administrator system 140 communicates with storage service 110 via a web-interface. For example, administrator system 140 communicates with storage service 110 via a web-browser installed on administrator system 140. As an example, administrator system 130 communicates with storage service 110 via an application running on administrator system 130.

According to various embodiments, system 100 comprises client system 140. Client system 140 is used by a user (e.g., a developer such as a developer of a feature, a developer of a model, a developer of a storage management policy, a user associated with a customer that exposes workloads to data store 120, etc.) to communicate with feature storage service 110 and/or data store 120. As an example, client system 140 communicates with storage service 110 via a web-interface. In some embodiments, a user uses client system 140 to develop a relational model at storage service 110, to modify a relational model storage service 110, to update one or more storage management policies at storage service 110, to query, store, or otherwise access data stored at data store 120, etc.

According to various embodiments, system 100 comprises virtual machine cluster 150. Virtual machine cluster may expose one or more workloads to data store 120. For example, one or more virtual machines of virtual machine cluster 150 or applications running on a virtual machine of virtual machine cluster 150 may store and/or access data stored at data store 120. In some embodiments, virtual machine cluster 150 comprises a hypervisor 152 and one or more virtual machines (e.g., virtual machine 154, virtual machine 156, etc.). Virtual machine cluster may be implemented by one or more servers. Hypervisor 152 may manage the instantiation/creation of a virtual machine within virtual machine cluster 150 and manage the operations of a virtual machine within virtual machine cluster 150. In related art systems, a storage system relied on hypervisor 152 to provide explicit classification/characterization of objects being stored on a data store by virtual machines of the virtual machine cluster 150. For example, related art systems used an explicit association between virtual machines and files stored on a data store by the virtual machines. In contrast, according to various embodiments, storage service 110 determines an implicit workload (e.g., virtual machine or application running on a virtual machine) of virtual machine cluster 150 with which to associate an object stored at data store 120. In some embodiments, a virtual machine in virtual machine cluster 150 is a workload that deploys data to a storage system such as data store 120 (e.g., the virtual machine is a workload that is to be associated with a stored object). In some embodiments, an application running on virtual machine in virtual machine cluster 150 is a workload that deploys data to a storage system such as data store 120 (e.g., the application is a workload that is to be associated with a stored object). In some embodiments, hypervisor 152 and one or more virtual machines (e.g., virtual machine 154, virtual machine 156, etc.) of virtual machine cluster 150 is a workload that deploys data to a storage system such as data store 120 (e.g., the virtual machine is a workload that is to be associated with a stored object).

In some embodiments, the one or more virtual machines (e.g., virtual machine 154, virtual machine 156, etc.) of virtual machine cluster 150 communicate directly across network 160 (e.g., with storage service 110, data store 120, administrator system 130, etc.). In some embodiments, hypervisor 152 of virtual machine cluster 150 mediates communication of information between the one or more virtual machines (e.g., virtual machine 154, virtual machine 156, etc.) of virtual machine cluster 150 and a network entity (e.g., storage service 110, data store 120, administrator system 130, etc.) across network 160.

In some embodiments, storage system layer 112, storage system manager layer 114, and/or business application layer 116 are implemented on a single server or a plurality of servers. For example, storage system layer 112 and storage system manager layer 114 are different modules running on a same server or set of servers. In some embodiments, storage service 110 and/or data store 120 are implemented on a single server or a plurality of servers.

Figure 2:
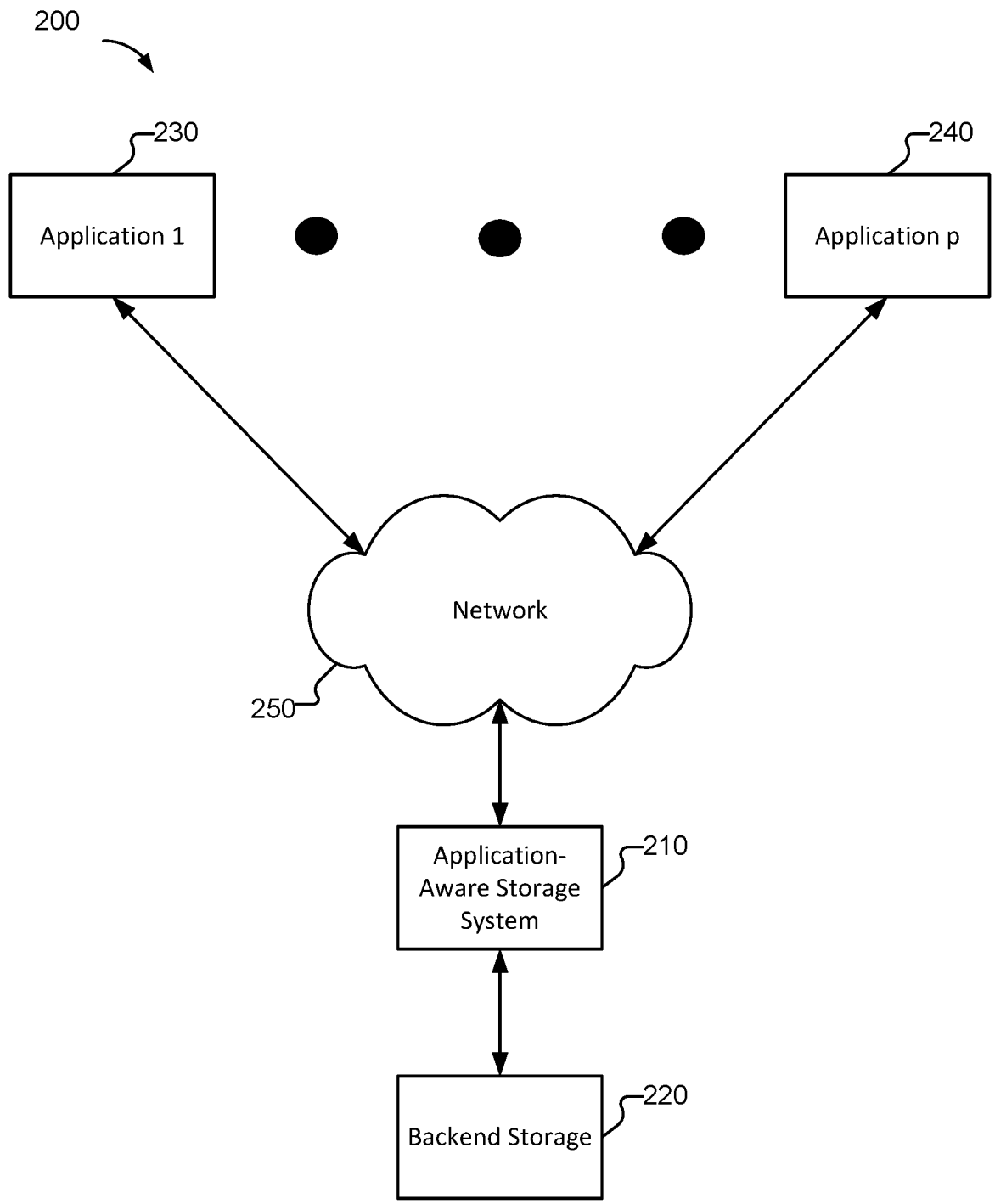
FIG. 2 is a block diagram of a system to infer a storage management object with which to associate a stored object according to various embodiments.

FIG. 2 is a diagram of a system for inferring a storage management object with which to associate a stored object according to various embodiments. System 200 may be another example of an architecture of a system for inferring a storage management object with which to associate a stored object (e.g., a system that infers an association similar to the manner of system 100 of FIG. 1). In some embodiments, system 200 implements at least process 400 of FIG. 4, process 500 of FIG. 5, process 600 of FIG. 6, process 700 of FIG. 7, and/or process 800 of FIG. 8.

In the example shown, system 200 includes application aware-storage system 210 and backend storage 220. System 200 may further comprise one or more applications (e.g., application 1 230, application p 240, etc.). System 200 may further comprise network 250 over which the one or more applications communicate with application-aware storage system 210 and/or backend storage 220.

According to various embodiments, application aware-storage system 210 comprises (or corresponds to) storage system manager layer 114 of system 100 of FIG. 1. In some embodiments, application aware-storage system 210 comprises (or corresponds to) storage service 110.

According to various embodiments, backend storage 220 corresponds to, or is similar to, data store 120 of system 100. As illustrated in FIG. 2, application aware-storage system 210 may be connected (e.g., directly connected) to backend storage 220. In some embodiments, application aware-storage system 210 runs on a same system (e.g., set of servers) as backend storage 220.

The one or more applications (e.g., application 1 230, application p 240, etc.) may store objects (e.g., stored objects) at backend storage 220. For example, application 1 230, application p 240, etc. may correspond to workloads (e.g., application workloads) that deploy data to backend storage. In some embodiments, application-aware storage system 210 interprets data deployed to backend storage 220 by the one or more applications and/or storage of stored objects associated with such workloads, and determines an association among a set of objects stored on back end storage 220 and/or an association between a stored object and or the workload (e.g., the application workload).

Figure 3:
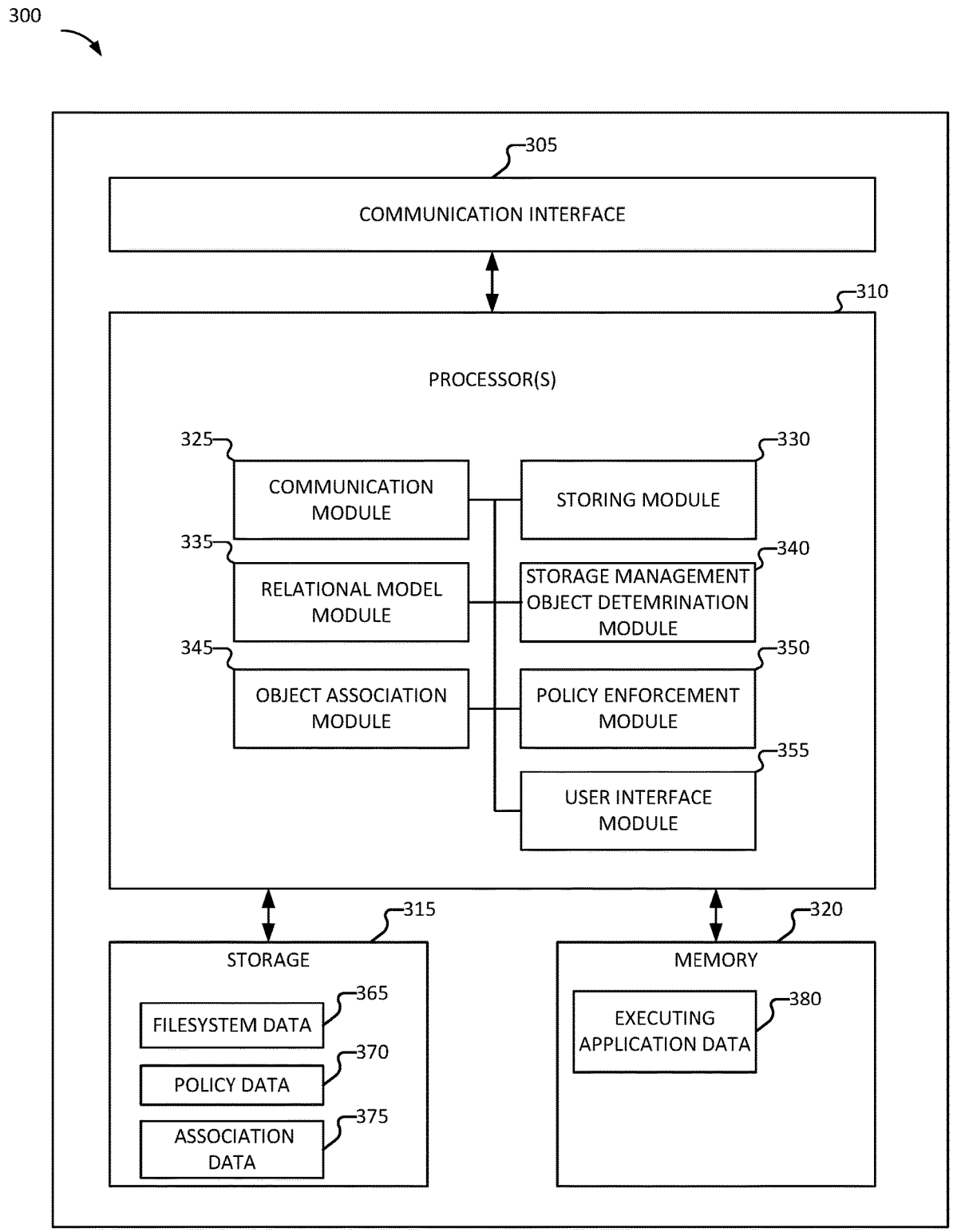
FIG. 3 is a diagram of a system for inferring a storage management object with which to associate a stored object according to various embodiments.

FIG. 3 is a diagram of a system for inferring a storage management object with which to associate a stored object according to various embodiments. In some embodiments, system 300 implements at least part of storage service 110 of system 100 of FIG. 1. For example, system 300 implements storage system manager layer 114 of system 100. In some embodiments, system 300 implements at least process 400 of FIG. 4, process 500 of FIG. 5, process 600 of FIG. 6, process 700 of FIG. 7, and/or process 800 of FIG. 8.

In the example shown, system 300 implements one or more modules in connection with grouping stored objects, associating one or more stored objects with a storage management object, managing/providing access to the stored objects, and/or enforcing one or more storage management policies. System 300 comprises communication interface 305, one or more processors 310, storage 315, and/or memory 320. One or more processors 310 comprises one or more of communication module 325, storing module 330, relational model module 335, storage management object determination module 340, object association module 345, policy enforcement module 350, and/or user interface module 355.

In some embodiments, system 300 comprises communication module 325. System 300 uses communication module 325 to communicate with various other systems such as a user system, an administrator system, a virtual machine, a virtual machine cluster, and/or a data store (e.g., a distributed data storage system). For example, communication module 325 provides to communication interface 305 information that is to be communicated. As another example, communication interface 305 provides to communication module 325 information received by system 300. Communication module 325 is configured to receive user input to a user system such as a data request for data stored in a data store, information pertaining to storage management policy (e.g., a new storage management policy, an update to a storage management policy), a validation of a classification/characterization of a stored object or storage management object, a validation of a rule for classifying/characterizing a stored object or storage management object, etc. The user input to the user system can include the creation of a new object, a modification or update to an object stored in a data store, a query for an object (e.g., a csv file, a library, a module, etc.), a request to set one or more storage management policies (e.g., a QoS policy, an allocation of resource policy, a snapshot policy), etc. Communication module 325 is configured to provide to user systems information that is responsive to one or more queries or tasks requested to be executed, a stored object (or a sub-object of the stored object such as a file of a database) at the data store, locations at which data is to be accessed, statistics pertaining to stored objects stored at the data store, information pertaining to one or more storage management policies, information pertaining to an association between a stored object and a storage management object (e.g., a mapping of stored objects to stored management objects), information pertaining to rules or models for classifying/characterizing stored objects or for associating stored objects with storage management objects, etc.

In some embodiments, system 300 comprises storing module 330. System 300 uses storing module 330 to store data on a storage system (e.g., at a data store). Examples of data include an object (e.g., a file, a file system, a database, etc.), information pertaining to a storage management policy, information pertaining to rules or models for classifying/characterizing stored objects, etc. Storing module 330 receives data to be stored on storages system from a device (e.g., a device such as client system 140 of system 100 of FIG. 1). In some embodiments, system 300 uses storing module 330 to provide a user system with access to data stored on a storage system (e.g., at a data store such as data store 120 of system 100 of FIG. 1).

In some embodiments, system 300 comprises relational mode module 335. System 300 uses relational mode module 335 to store and/or determine a relational model for grouping stored objects on a storage system (e.g., at a data store) and/or for associating a stored object (or a set of stored objects) with a storage management object. Relational mode module 335 stores (or has access to) one or more relationships and relational models for grouping objects stored on data store 120 and/or for mapping an object (or a set of stored objects) to a storage management object (e.g., a workload such as virtual machine or an application). In some embodiments, relational mode module 335 uses a machine learning process in connection with determining the implicit grouping of objects stored on a storage system (e.g., a data store) and/or for determining an implicit mapping of object (s) to workload. System 200 may store (or have access to) a machine learning model and/or a feature to user in connection training or applying such machine learning model. Examples of machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc. Relational model 335 may infer a relationship between the one or more stored objects and the storage management object based at least in part on one or more rules for classifying or characterizing an object. The one or more rules may be determined based on a machine learning process. Various other techniques for defining/setting the one or more rules may be implemented. In some embodiments, in connection with determining (e.g., defining) the one or more rules one or more rules for classifying or characterizing an object and/or one or more rules for associating a stored object with a storage management object, relational mode module 335 provides information pertaining to the applicable rule to a user for the user (e.g., an administrator) to validate the rule. For example, relational mode module 335 may cause a user interface comprising information pertaining to the new rule to be configured and provided to a user system.

In some embodiments, system 300 comprises storage management object determination module 340. System 300 uses storage management object determination module 340 to associate to a stored object (or a set of stored object) to an applicable storage management object. Storage management object determination module 340 may associate the stored object to the storage management object based at least in part on relational model of relational model module 335. For example, storage management object determination module 340 may determine (e.g., infer) an implicit storage management object with which a particular stored object (or set of stored objects) is to be associated. In some embodiments, storage management object determination module 340 determines storage management object with which a particular stored object is associated based at least part on one or more attributes associated with the particular stored object and the relational model (or one or more rules for classifying/characterizing the stored object). Storage management object determination module 340 may determine the implicit mapping based at least in part on one or more attributes of the stored object (or a set of stored objects) such as an object size or an object type. Examples of attributes associated with a stored object include a location of the object, a size of the object (e.g., a file size), a type of object, a file extension of the object, an access pattern, a creation pattern, a signature or hash of the stored object, update frequency, etc.

According to various embodiments, system 300 uses storage management object determination module 340 to monitor a storage system (e.g., data store 120 of system 100) for stored objects that are not associated with (e.g., mapped to) a storage management object. For example, storage management object determination module 340 monitors a storage system to detect stray objects. In response to determining that storage system comprises stray objects, storage management object determination module 340 determines a storage management object with which to associate the stray object. In some embodiments, storage management object determination module 340 infers an association among a set of stray objects (e.g., storage management object determination module 3240 groups a plurality of stored objects into a set of stored objects to be associated with a storage management object).

In some embodiments, system 300 comprises association module 345. System 300 uses association module 345 to store an association between a plurality of stored objects, and/or to store an association between a stored object (or a set of stored objects) and a storage management object. For example, in response to storage management object determination module 340 determining the storage management object with which the stored object is to be associated, association module 345 stores the association such as in association data 375 of storage 315. In some embodiments, storage management object determination module 340 updates a mapping of stored objects to storage management objects in response to determining the storage management object (e.g., an implicit workload) with which the stored object is to be associated.

In some embodiments, system 300 comprises policy enforcement module 350. System 300 uses policy enforcement module 350 to enforce one or more policies in connection with managing storage and/or access of stored objects on a storage system (e.g., data store 120 of system 100 of FIG. 1). For example, policy enforcement module 350 applies a storage management policy with respect to the stored objects comprising the set of stored objects based at least in part on the association of the stored objects comprising the set of stored objects with the storage management object. For example, the system determines a storage management policy corresponding to storage management object and uses such storage management policy in connection with storing and/or providing access to the set of stored objects. As an example, a storage management policy may pertain to one or more of (i) a quality of service, (ii) an allocation of resources, (iii) a replication or snapshot of data, (iv) a monitoring of performance or usage, and (v) an isolation from explicit workloads associated with a same application. Various other types of storage management policies may be implemented.

In some embodiments, system 300 comprises user interface module 355. System 300 uses user interface module 355 to provide information to a user system, including information pertaining to a stored object, locations at which stored object is to be accessed, statistics pertaining to stored objects, information pertaining to one or more storage management policies, information pertaining to an association between a stored object and a storage management, information pertaining to rules or models for classifying/characterizing stored objects or for associating stored objects with storage management objects, etc.). User interface module 350 can provide a workspace in a web user interface that is rendered at a user system (e.g., rendered in a web browser via which user system is accessing the system). User interface module 350 can further provide a user interface to an administrator system such as administrator system 150 to enable an administrator to manage and/or configuring settings of system 300 or managed data service 120. In some embodiments, user interface module 350 provides a user interface for various other applications such as applications provided by a business application layer.

According to various embodiments, storage 315 comprises one or more of filesystem data 365, policy data 370, and/or association data 375. Storage 215 comprises a shared storage (e.g., a network storage system) and/or database data, and/or user activity data. In some embodiments, filesystem data 365 comprises a database such as one or more datasets (e.g., one or more datasets for one or more features, etc.). Filesystem data 365 comprises data such as a code used in connection with development of a relational model, attributes pertaining to stored objects, access patterns of stored objects, etc. In some embodiments, policy data 370 comprises one or more storage management policies and/or information pertaining to one or more storage management policies such as mapping of storage management policies to storage management objects to determine one or more policies to apply with respect to a particular stored object. In some embodiments, association data 375 comprises information pertaining to a grouping of one or more stored objects and/or an association between a stored object (or a set of stored objects) and a storage management object(s). For example, association data 375 comprises a mapping of stored objects to storage management objects.

According to various embodiments, memory 320 comprises executing application data 380. Executing application data 380 comprises data obtained or used in connection with executing an application such as an application executing in connection with providing access to stored objects, training a relational model, applying a relational model to classify/characterize stored objects and/or to associate stored objects to storage management objects, applying/enforcing storage management policies, updating policies, updating classification/characterization rules, monitoring storage systems for stray objects, etc. In embodiments, the application comprises one or more applications that perform one or more of receive and/or execute a query or task, generate a report and/or configure information that is responsive to an executed query or task, and/or to provide to a user information that is responsive to a query or task. Other applications comprise any other appropriate applications (e.g., a communications application, a chat application, a web browser application, a document preparation application, a report preparation application, a user interface application, a data analysis application, an anomaly detection application, a user authentication application, a security policy enforcement application, an application for validating rules to classify/characterize stored objects, etc.).

Figure 4:
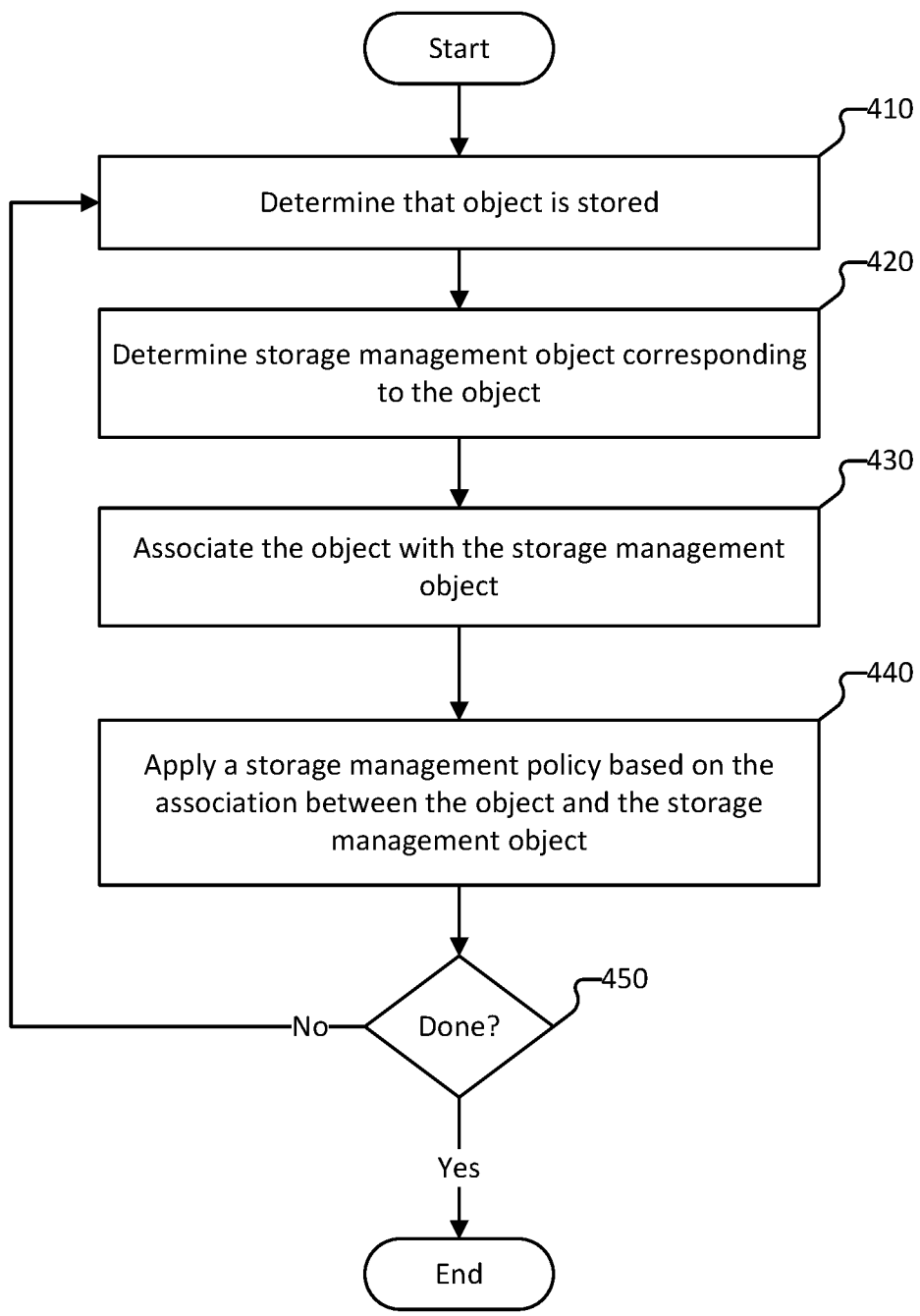
FIG. 4 is a flow diagram of a method for determining a storage management object with which to associate a stored object according to various embodiments.

FIG. 4 is a flow diagram of a method for determining a storage management object with which to associate a stored object according to various embodiments. In some embodiments, process 400 may be implemented at least in part by system 100 of FIG. 1, system 200 of FIG. 2, and/or system 300 of FIG. 3.

At 410, an object is determined to be stored. In some embodiments, the system monitors a storage system (e.g., data store 120 of system 100 of FIG. 1) for stored objects. For example, the system monitors the storage system for stored objects that are not associated with a particular storage management object (e.g., to detect stray objects). In some embodiments, the system detects stored objects for which the system is to determine an implicit workload/as At 420, a storage management object corresponding to the object is determined. In some embodiments, the system determines a storage management object corresponding to the object based at least in part on one or more attributes associated with the object. For example, the system determines the storage management object based at least in part on an object type (e.g., file type, file extension, etc.), an object size, a location of the object (e.g., a directory in which a file is stored, a relative location of the file such as a location relative to one or more other files or directories, etc.).

According to various embodiments, the storage management object corresponding to the object is an implicit storage management object. For example, the system uses a relational model to infer the storage management object with which the object is associated. In some embodiments, the relational model corresponds to a machine learning model. In some embodiments, the relational model comprises one or more rules for classifying an object. The one or more rules may be determined based on a machine learning process. Various other techniques for defining/setting the one or more rules may be implemented.

Examples of attributes associated with a stored object include a location of the object, a size of the object (e.g., a file size), a type of object, a file extension of the object, an access pattern, a creation pattern, a signature or hash of the stored object, update frequency, etc. An attribute may be included in metadata associated with the stored object. Various other attributes associated with a stored object may be implemented.

At 430, the object is associated with the storage management object. In some embodiments, in response to determining the storage management object corresponding to the object, the system stores an association between the object and the storage management object. For example, the system updates a mapping of stored objects to storage management objects based at least in part on the determination of the storage management object corresponding to the object.

At 440, a storage management policy is applied based at least in part on the association between the object and the storage management object. In some embodiments, the system determines a storage management policy to enforce/apply with respect to the object based at least in part on the association between the object and the storage management object. For examples, the system performs a lookup against a mapping of storage management policies to storage management objects based on the storage management object associated with the object. For example, the system determines a storage management policy corresponding to storage management object and uses such storage management policy in connection with storing and/or providing access to the set of stored objects. As an example, a storage management policy may pertain to one or more of (i) a quality of service, (ii) an allocation of resources, (iii) a replication or snapshot of data, (iv) a monitoring of performance or usage, and (v) an isolation from explicit workloads associated with a same application. Various other types of storage management policies may be implemented.

At 450, a determination is made as to whether process 400 is complete. In some embodiments, process 400 is determined to be complete in response to a determination that no further stored objects are to be associated with a storage management object, monitoring for stored objects is stopped, an administrator indicates that process 400 is to be paused or stopped, etc. In response to a determination that process 400 is complete, process 400 ends. In response to a determination that process 400 is not complete, process 400 returns to 410.

Figure 5:
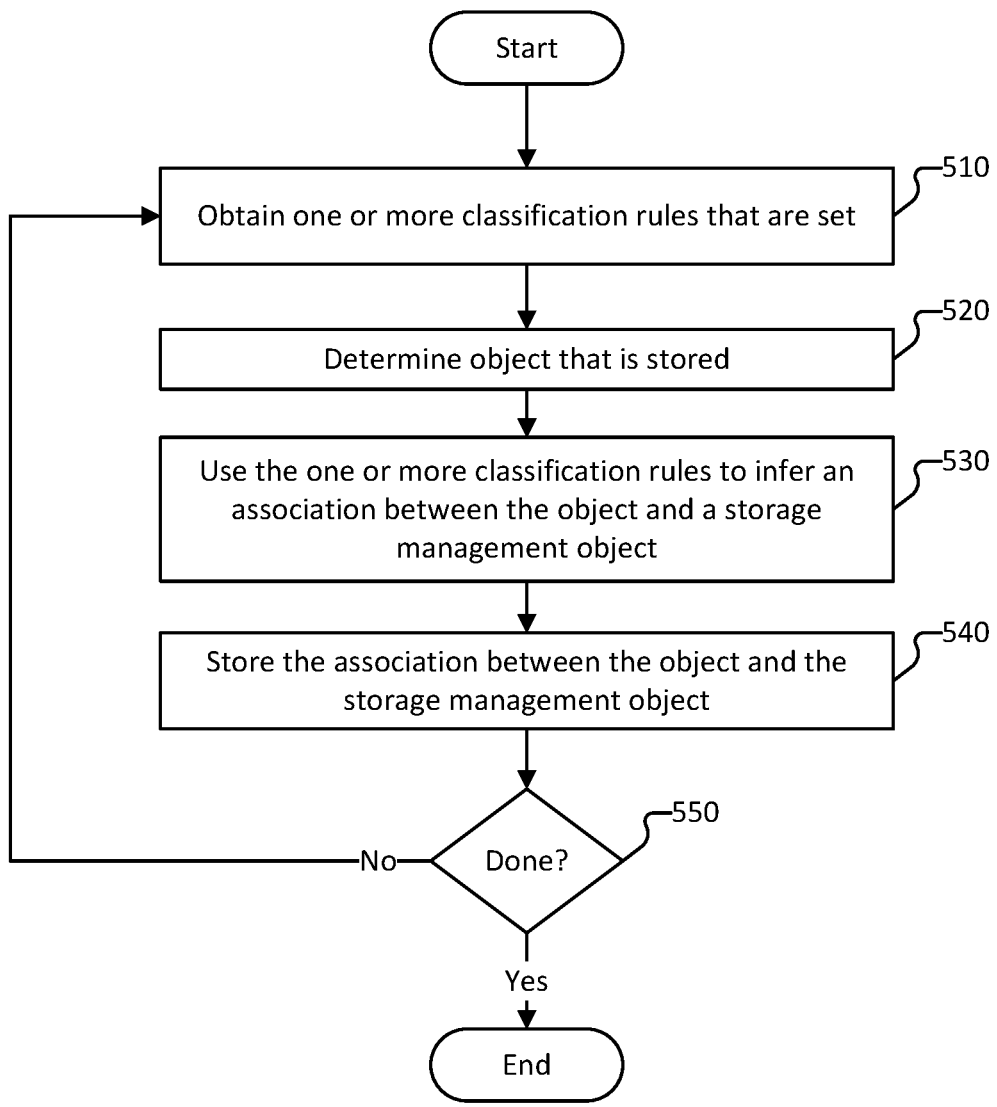
FIG. 5 is a flow diagram of a method for determining a storage management object with which to associate a stored object according to various embodiments.

FIG. 5 is a flow diagram of a method for determining a storage management object with which to associate a stored object according to various embodiments. In some embodiments, process 500 may be implemented at least in part by system 100 of FIG. 1, system 200 of FIG. 2, and/or system 300 of FIG. 3.

At 510, one or more classification rules that are set are obtained. In some embodiments, the system stores a set of rules for classifying/characterizing objects. As an example, the system may use a set of rules in connection with grouping objects stored on a storage system. As another example, the system may use a set of rules in connection with determining a storage management object with which to associate an object stored on a storage system (e.g., a stray object).

The one or more classification rules may be determined based at least in part on a machine learning process/model. The system may determine new classification rules for classifying/characterizing a stored object and/or rules for associating a stored object with a storage management object in response to a determination that a new file or new workload, such as an application, are identified. In some embodiments, in response to determining a new rule, the system requests a user (e.g., an administrator such as an administrator of a storage system, or an administrator of a customer that deploys workloads to store objects on the storage system) to validate the new rule. For example, the system may configure and provide a user interface comprising information pertaining to the new rule (e.g., information indicating mapping of a set of files to a workload, etc.). Examples of machine learning processes that can be implemented in connection with training the model (e.g., determining the classification rules) include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc.

In some embodiments, the one or more classification rules are set or refined by a user such as a developer of a workload (e.g., a storage management object), an administrator of a storage system, an administrator of a customer that exposes workloads to the storage system, etc. For example, a relational model may be trained using user-defined classifications.

At 520, an object that is stored is determined. In some embodiments, the system detects objects stored on a storage system that are not mapped to a particular workload. The system may monitor the storage service continuously or at periodic intervals (e.g., predetermined intervals that may be set by an administrator).

At 530, the one or more classification rules are used to infer an association between the object and a storage management object. In some embodiments, the system determines an association the object and a storage management object without an explicit characterization/classification of the object such as by a database manager, a hypervisor, an application, etc. In response to detecting a stray object (or set of stray objects), the system uses the one or more relationships and relational models (e.g., the one or more classification rules) to group the stray objects and/or to map the stray object (or a set of stored objects) to a corresponding storage management object.

At 540, an association between the object and the storage management object is stored. In some embodiments, in response to determining the storage management object corresponding to the object, the system stores an association between the object and the storage management object. For example, the system updates a mapping of stored objects to storage management objects based at least in part on the determination of the storage management object corresponding to the object.

At 550, a determination is made as to whether process 500 is complete. In some embodiments, process 500 is determined to be complete in response to a determination that no further stored objects are to be associated with a storage management object, monitoring for stored objects is stopped, an administrator indicates that process 500 is to be paused or stopped, etc. In response to a determination that process 500 is complete, process 500 ends. In response to a determination that process 500 is not complete, process 500 returns to 510.

Figure 6:
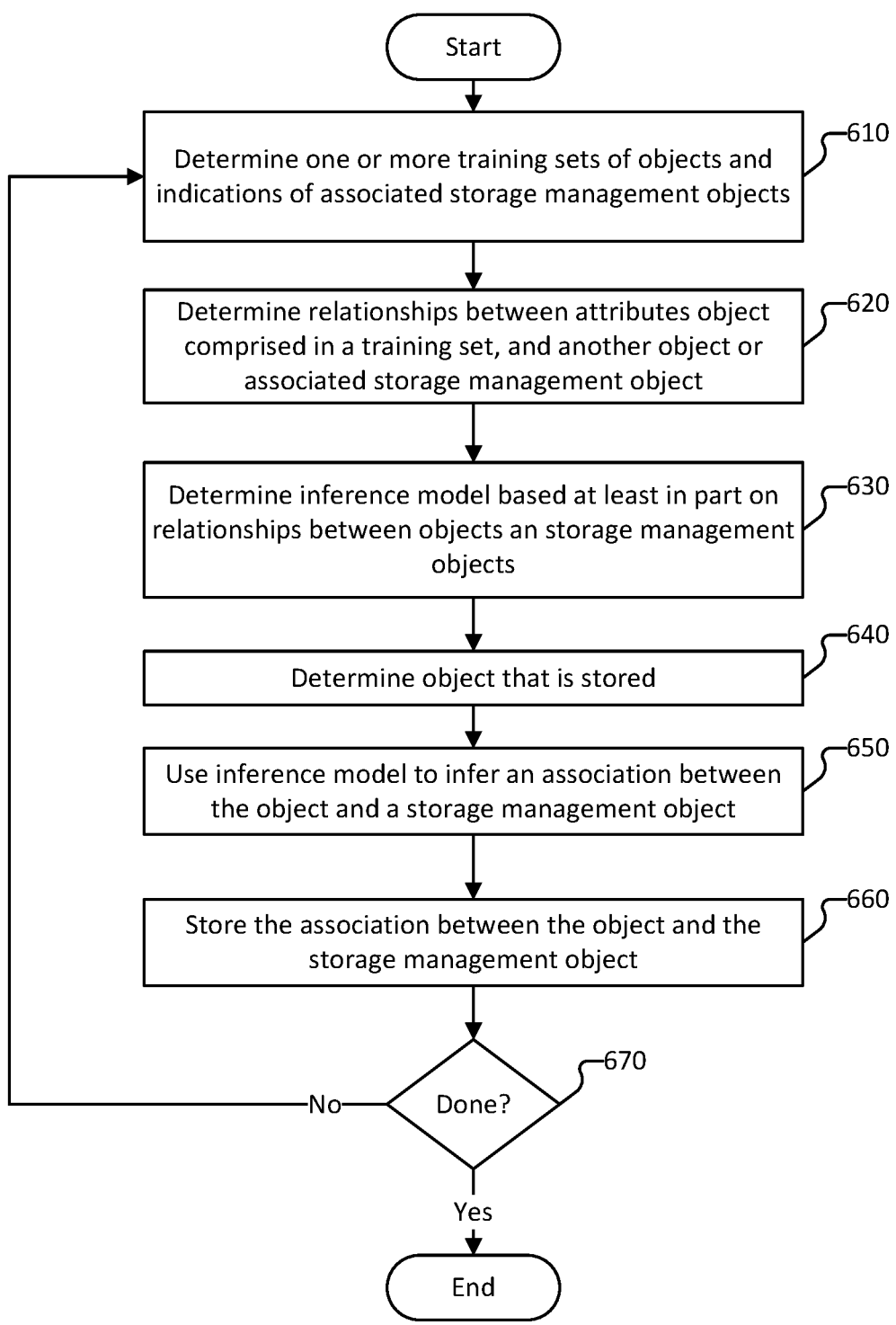
FIG. 6 is a flow diagram of a method for determining a storage management object with which to associate a stored object according to various embodiments.

FIG. 6 is a flow diagram of a method for determining a storage management object with which to associate a stored object according to various embodiments. In some embodiments, process 600 may be implemented at least in part by system 100 of FIG. 1, system 200 of FIG. 2, and/or system 300 of FIG. 3.

At 610, one or more training sets of objects and indications of associated storage management objects are determined. In some embodiments, the system obtains historical information with which to train a relational model (e.g., a set of rules for classifying/characterizing stored object). As an example, the historical information may comprise a set of stored objects and/or storage management objects. As another example, the historical information comprises a set of attributes associated with a set of stored objects, and a set of associations between the set of stored objects and a set of storage management objects. The historical information may comprise information pertaining to attributes associated with the set of storage management objects (e.g., an application type, a workload type, a customer, etc.).

At 620, relationships between attributes of objects comprised in the training set and other objects or associated storage management objects are determined. In some embodiments, the system determines the relationships between attributes of objects and other objects or associated storage management objects based at least in part on the historical information.

According to various embodiments, the system determines one or more features to be used in connection with a machine learning process/model. As used herein, a feature is a measureable property or characteristic manifested in input data, which may be raw data such as the historical information. As an example, a feature may be as set of one or more relationships manifested in the input data At 630, an inference model is determined based at least in part on the relationships between attributes of objects comprised in the training set and other objects or associated storage management objects. In some embodiments, the inference model (e.g., a relational model) is determined using a machine learning process. For example, the inference model may be a machine learning model. Examples of machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc.

In some embodiments, the system provides information pertaining to the inference model (e.g., one or more rules comprised in the inference model) to a user for validation.

At 640, an object is determined to be stored. In some embodiments, the system detects objects stored on a storage system that are not mapped to a particular workload. The system may monitor the storage service continuously or at periodic intervals (e.g., predetermined intervals that may be set by an administrator).

At 650, the inference model is used to infer an association between the object and a storage management object. In some embodiments, the system determines an association the object and a storage management object without an explicit characterization/classification of the object such as by a database manager, a hypervisor, an application, etc. In response to detecting a stray object (or set of stray objects), the system uses the one or more relationships and relational models (e.g., the one or more classification rules) to group the stray objects and/or to map the stray object (or a set of stored objects) to a corresponding storage management object.

At 660, the association between the object and the storage management object is stored. In some embodiments, in response to determining the storage management object corresponding to the object, the system stores an association between the object and the storage management object. For example, the system updates a mapping of stored objects to storage management objects based at least in part on the determination of the storage management object corresponding to the object.

At 670, a determination is made as to whether process 600 is complete. In some embodiments, process 600 is determined to be complete in response to a determination that no further models are to be determined, an administrator indicates that process 600 is to be paused or stopped, etc. In response to a determination that process 600 is complete, process 600 ends. In response to a determination that process 600 is not complete, process 600 returns to 610.

Figure 7:
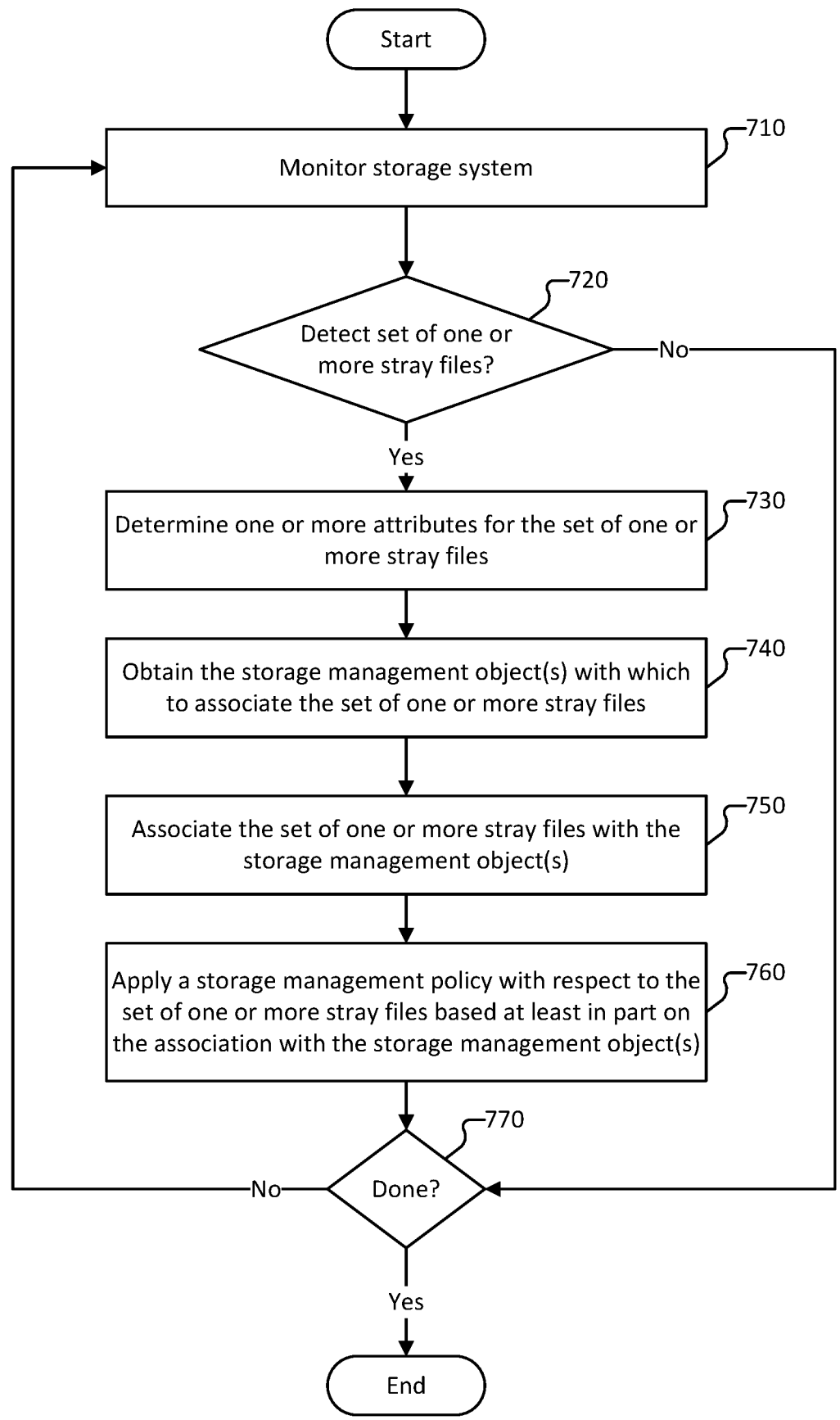
FIG. 7 is a flow diagram of a method for determining a storage management object with which to associate a stored object according to various embodiments.

FIG. 7 is a flow diagram of a method for determining a storage management object with which to associate a stored object according to various embodiments. In some embodiments, process 700 may be implemented at least in part by system 100 of FIG. 1, system 200 of FIG. 2, and/or system 300 of FIG. 3.

At 710, a storage system is monitored. In some embodiments, the system monitors a storage system in connection with determining whether any stored objects are not associated with (e.g., mapped to) a storage management object. For example, the system monitors the storage system to detect stray objects stored thereon. The system may monitor the storage service continuously or at periodic intervals (e.g., predetermined intervals that may be set by an administrator). As an example, the monitoring the storage system may comprise walking through the storage system (e.g., directories on the storage system) and using an identifier associated with stored objects to query a mapping of stored objects to storage management objects. As an example, the monitoring the storage system may comprise walking through the storage system (e.g., directories on the storage system) and determining whether metadata associated with stored objects indicate whether the stored objects are associated with a storage management object.

At 720, a determination is made as to whether a set of one or more stray files is detected. In some embodiments, the system determines whether the storage system comprises a set of one or more stray files based at least in part on an attribute associated with the one or more stray files (e.g., determining whether metadata associated with stored objects indicate whether the stored objects are associated with a storage management object). In some embodiments, the system determines whether the storage system comprises a set of one or more stray files based at least in part on using an identifier associated with stored objects to query a mapping of stored objects to storage management objects.

In response to a determination that a set of one or more stray files is not detected at 720, process 700 proceeds to 770. Conversely, in response to a determination that a set of one or more stray files is detected at 720, process 700 proceeds to 730.

At 730, one or more attributes are determined for the set of one or more stray files. In response to determining that a particular file is not associated with a storage management object, the system obtains attributes associated with the particular file. The attributes associated with the particular file that are obtained are those attributes that are used in connection with applying a relational model (e.g., an inference model, a set of one or more classification rules) to infer/determine a storage management object with which the file is to be associated.

At 740, the storage management object(s) with which the set of one or more stray files is to be associated is obtained. In some embodiments, the obtaining the storage management object(s) comprises determining the storage management object(s) based at least in part on applying a relational model (e.g., an inference model, a set of one or more classification rules) to infer/determine a storage management object with which the file is to be associated. In some embodiments, the obtaining the storage management object comprises determining whether the implicit storage management object (e.g. the storage management object inferred using the relational model) is an existing storage management object or a storage management object to be created.

In the case that the implicit storage management object is an existing storage management object, the obtaining the storage management object may comprise obtaining an identifier and/or address corresponding to the storage management object. Various other information (e.g., metadata) associated with the storage management object may be obtained.

In the case that the implicit storage management object is to be created, the system creates a new identifier/record for the storage management object. Information such as metadata may be created and associated with the created storage management object based at least in part on a template corresponding to a type of storage management object, or based on inferred information determined using the relational model.

At 750, the set of one or more stray files is associated with the storage management object(s). In some embodiments, in response to determining the storage management object corresponding to the set of one or more stray files, the system stores an association between the set of one or more stray files and the storage management object. For example, the system updates a mapping of stored objects to storage management objects based at least in part on the determination of the storage management object corresponding to the set of one or more stray files.

At 760, a storage management policy is applied with respect to the set of one or more stray files based at least in part on the association with the storage management object(s). In some embodiments, the system determines a storage management policy to enforce/apply with respect to the object based at least in part on the association between the set of one or more stray files and the storage management object. For examples, the system performs a lookup against a mapping of storage management policies to storage management objects based on the storage management object associated with the set of one or more stray files. For example, the system determines a storage management policy corresponding to storage management object and uses such storage management policy in connection with storing and/or providing access to the set of one or more stray files. As an example, a storage management policy may pertain to one or more of (i) a quality of service, (ii) an allocation of resources, (iii) a replication or snapshot of data, (iv) a monitoring of performance or usage, and (v) an isolation from explicit workloads associated with a same application. Various other types of storage management policies may be implemented.

At 770, a determination is made as to whether process 700 is complete. In some embodiments, process 700 is determined to be complete in response to a determination that no further set of stray files are to be associated with a storage management object, monitoring for stray files is stopped, an administrator indicates that process 700 is to be paused or stopped, etc. In response to a determination that process 700 is complete, process 700 ends. In response to a determination that process 700 is not complete, process 700 returns to 710.

Although process 700 is described in connection with associating a set of one or more stray file with a storage management object, process 700 may be similarly be implemented for associating a set of object.

Figure 8:
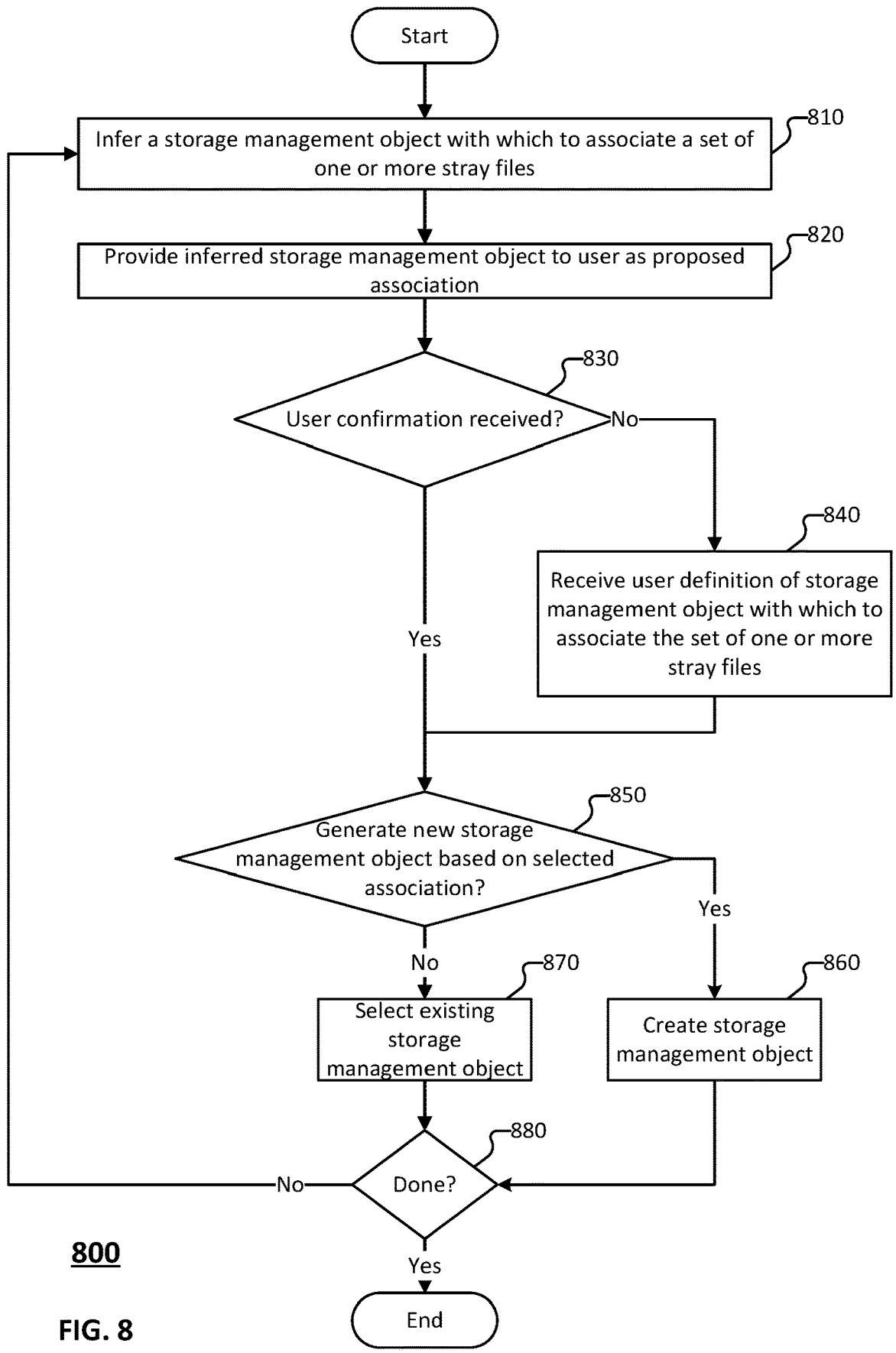
FIG. 8 is a flow diagram of a method for determining a storage management object with which to associate a stored object according to various embodiments.

FIG. 8 is a flow diagram of a method for determining a storage management object with which to associate a stored object according to various embodiments. In some embodiments, process 800 may be implemented at least in part by system 100 of FIG. 1, system 200 of FIG. 2, and/or system 300 of FIG. 3.

At 810, a storage management object with which to associate a set of one or more stray files is inferred. In some embodiments, the obtaining the storage management object(s) comprises determining the storage management object(s) based at least in part on applying a relational model (e.g., an inference model, a set of one or more classification rules) to infer/determine a storage management object with which the file is to be associated.

At 820, the inferred storage management object is provided to a user as a proposed association for the set of one or more stray files. In some embodiments, in response to determining (e.g., inferring) an implicit storage management object with which to associate a set of one or more stray files, the system provides the implicit storage management object to a user to confirm/validate the inferring of the storage management object. The system may provide to the user information pertaining to the implicit storage management object and/or the set of one or more stray files.

At 830, a determination is made as to whether a user confirmation of the proposed association is received. In some embodiments, in response to providing the user with the proposed association for the set of one or more stray files, the system determines whether a confirmation of the proposed association for the set of one or more stray files has been received from the user. As an example, the system may determine that if a confirmation is not received within a threshold period of time (e.g., a preset amount of time) that proposed association is confirmed. For example, the lack of an express confirmation from the user within the threshold period of time may be deemed a confirmation.

In response to determining that at user confirmation is not received at 830, process 800 proceeds to 840 at which a user definition of a storage management object with which to associate the set of one or more stray files is received. For example, if the user provides an indication that the proposed association is not correct or requires modification, the system may determine that user confirmation is not received, and the system may obtain a correct association (e.g., a user-defined or user-selected system management object with which to associate the set of one or more stray files) or modification to the proposed association. Thereafter, process 800 proceeds to 850.

In response determining that a user confirmation is not received at 830, process 800 proceeds to 850 at which a determination is made as to whether to generate a new storage management object based on the selected association. For example, the system determines whether to inferred storage management object or the storage management object selected by the user corresponds to an existing storage management object, or whether a new storage management object is to be created for the system to associate the set of one or more stray files.

In response to determining that a storage management object is to be created for association with the set of one or more stray files at 850, process 800 proceeds to 860 at which the storage management object is created. Thereafter, process 800 proceeds to 880. In the case that the implicit storage management object is to be created, the system creates a new identifier/record for the storage management object. Information such as metadata may be created and associated with the created storage management object based at least in part on a template corresponding to a type of storage management object, or based on inferred information determined using the relational model.

In response to determining that a storage management object is to not be created for association with the set of one or more stray files at 850, process 800 proceeds to 870 at which the storage management object is determined among existing storage management objects. Thereafter, process 800 proceeds to 880. In the case that the implicit storage management object is an existing storage management object, the obtaining the storage management object may comprise obtaining an identifier and/or address corresponding to the storage management object. Various other information (e.g., metadata) associated with the storage management object may be obtained.

At 880, a determination is made as to whether process 800 is complete. In some embodiments, process 800 is determined to be complete in response to a determination that no further set of stray files are to be associated with a storage management object, an administrator indicates that process 800 is to be paused or stopped, etc. In response to a determination that process 800 is complete, process 800 ends. In response to a determination that process 800 is not complete, process 800 returns to 810.

Although process 800 is described in connection with associating a set of one or more stray file with a storage management object, process 800 may be similarly be implemented for associating a set of object.

Figure 9:
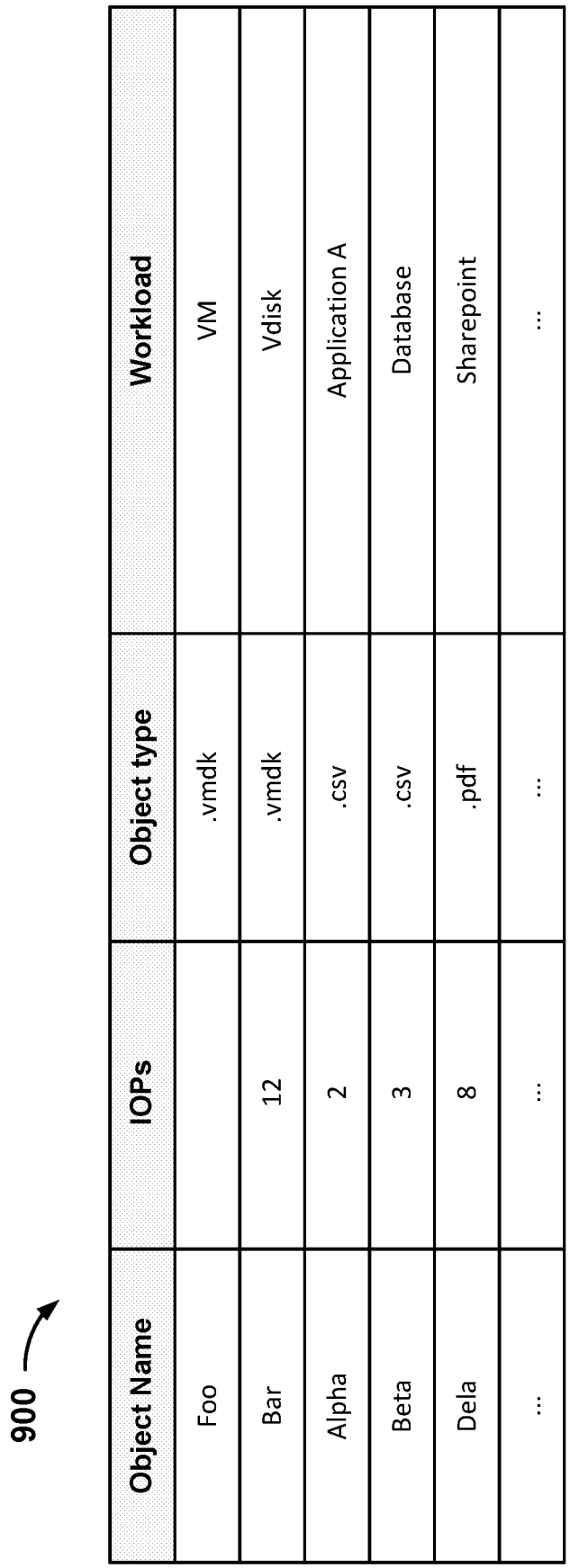
FIG. 9 is diagram showing an example user interface that can be provided by a storage system management server according to various embodiments.

FIG. 9 is diagram showing an example user interface that can be provided by a storage system management server according to various embodiments. In some embodiments, 900 is provided by system 100 of FIG. 1, system 200 of FIG. 2, and/or system 300 of FIG. 3.

In the example illustrated in FIG. 9, mapping 900 includes a mapping of stored objects to workloads (e.g., storage management objects). Mapping 900 may include one or more attributes pertaining to the stored objects. For example, mapping 900 may comprise an indication of IOPs (e.g., the rate of read and access to the files system object), and object type (e.g., a file extension of the object). Various other attributes pertaining to the stored objects may be comprised in mapping 900. According to various embodiments, mapping 900 (or part of mapping 900) may be provided to a user.

For example, a record comprised in mapping 900 (e.g., a row of mapping 900) may be provided to a user via a user interface for a user to validate/confirm the mapping/association.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A storage system, comprising:
   a memory or other data storage device; and
   one or more processors coupled to the memory or other data storage device and configured to:
   detect that a set of stored objects stored in the memory or other data storage device have not been associated with a storage management object;
   in response to detecting that the set of stored objects has not been associated with a storage management object,
   infer, based at least in part on metadata associated with the set of stored objects stored in the memory or other data storage device, an interdependence among the stored objects comprising the set of stored objects;
   associate the stored objects comprising the set of stored objects with the storage management object; and
   apply a storage management policy to the stored objects comprising the set of stored objects based at least in part on said association of the stored objects comprising the set of stored objects with the storage management object.

2. The storage system of claim 1, wherein the set of stored objects includes a plurality of files.

3. The storage system of claim 2, wherein the plurality of files are associated with an application.

4. The storage system of claim 2, wherein the plurality of files correspond to a workload.

5. The storage system of claim 1, wherein the storage management policy pertains to one or more of (i) a quality of service, (ii) an allocation of resources, (iii) a replication or snapshot of data, (iv) a monitoring of performance or usage, and (v) an isolation from explicit workloads associated with a same application.

6. The storage system of claim 5, wherein the quality of service is associated with one or more of a performance isolation and or a performance protection.

7. The storage system of claim 5, wherein the monitoring of performance or usage includes a policy for collecting statistics associated with the performance or usage of the storage system.

8. The storage system of claim 1, wherein the interdependence among the stored objects is inferred based at least in part on one or more of (i) access patterns, (ii) a file type or file extension, (iii) a file size, (iv) creation patterns, (v) a comparison of patterns in a production environment and a development environment, and (vi) a learning of a machine learning model.

9. The storage system of claim 1, wherein:
the one or more processors are further configured to:
cause a user interface to be displayed at a client;
the user interface prompts a user to confirm the association between the stored objects comprising the set of stored objects with the storage management object.

10. The storage system of claim 9, wherein:
the user interface comprises one or more elements to which a user inputs a modification to the inferred interdependence among the stored objects comprising the set of stored objects.

11. The storage system of claim 10, wherein:
in response to receiving the modification to the inferred interdependence among the stored objects comprising the set of stored objects, an association between the storage management object and the stored objects comprising the set of stored objects is updated.

12. The storage system of claim 1, wherein inferring the interdependence among the stored objects comprising the set of stored objects is further based on:
finding objects not explicitly assigned to a management object;
analyzing file data and metadata associated with the objects; and
grouping the objects into application workloads.

13. The storage system of claim 1, wherein associating the stored objects comprising the set of stored objects with the storage management object is based at least in part an explicit association indicated by an application stored object manager.

14. The storage system of claim 1, wherein associating the stored objects comprising the set of stored objects with the storage management object is based at least in part on a user input.

15. The storage system of claim 14, wherein the user input is manually input to a user interface by an administrator.

16. The storage system of claim 1, wherein associating the stored objects comprising the set of stored objects with the storage management object is based at least in part on an inference among the stored objects comprising the set of stored objects.

17. The storage system of claim 1, wherein the association of the stored objects comprising the set of stored objects with the storage management object is determined based at least in part on a virtual machine or application from which the set of stored objects is received.

18. The storage system of claim 1, wherein the storage management object corresponds to an element from which a workload is received.

19. The storage system of claim 18, wherein the element corresponds to one or more of a virtual machine, an application, and a physical device.

20. A method, comprising:
detecting, by one or more processors, that a set of stored objects that are stored in the memory or other data storage device have not been associated with a storage management object;
in response to detecting that the set of stored objects has not been associated with a storage management object, inferring, based at least in part on metadata associated with the set of stored objects stored in the memory or other data storage device, an interdependence among the stored objects comprising the set of stored objects;
associating the stored objects comprising the set of stored objects with the storage management object; and
applying a storage management policy to the stored objects comprising the set of stored objects based at least in part on said association of the stored objects comprising the set of stored objects with the storage management object.

21. A computer program product embodied in a non-transitory computer readable medium and comprising computer instructions for:
detecting, by one or more processors, that a set of stored objects that are stored in the memory or other data storage device have not been associated with a storage management object;
in response to detecting that the set of stored objects has not been associated with a storage management object, inferring, based at least in part on metadata associated with the set of stored objects stored in the memory or other data storage device, an interdependence among the stored objects comprising the set of stored objects;
associating the stored objects comprising the set of stored objects with the storage management object; and
applying a storage management policy to the stored objects comprising the set of stored objects based at least in part on said association of the stored objects comprising the set of stored objects with the storage management object.

22. The storage system of claim 1, wherein inferring the interdependence among the stored objects comprising the set of stored objects comprises:
obtaining the metadata comprising or otherwise associated with a set of stored objects stored in the memory or other data storage device;
querying, based at least in part on the metadata, a relational model to classify one or more of the stored objects; and
determining an association between the one or more stored objects with the storage management object.

23. The storage system of claim 1, wherein at least one of the detected set of stored objects was stored in the memory or other storage device by a virtual machine without an explicit classification or characterization of the at least one stored object by a hypervisor.

* * * * *